April 27, 1965      J. D. BAILEY      3,179,984

FREIGHT VEHICLE DOOR ARRANGEMENT

Filed March 17, 1961      7 Sheets-Sheet 1

INVENTOR.
JOHN D. BAILEY
BY
Wayne Morris Russell.

April 27, 1965   J. D. BAILEY   3,179,984
FREIGHT VEHICLE DOOR ARRANGEMENT
Filed March 17, 1961   7 Sheets-Sheet 2

INVENTOR.
JOHN D. BAILEY

April 27, 1965  J. D. BAILEY  3,179,984
FREIGHT VEHICLE DOOR ARRANGEMENT
Filed March 17, 1961

INVENTOR.
JOHN D. BAILEY
BY

INVENTOR.
JOHN D. BAILEY

INVENTOR.
JOHN D. BAILEY under# United States Patent Office 3,179,984
Patented Apr. 27, 1965

3,179,984
FREIGHT VEHICLE DOOR ARRANGEMENT
John D. Bailey, Chicago, Ill., assignor to Pullman Incorporated, Chicago, Ill., a corporation of Delaware
Filed Mar. 17, 1961, Ser. No. 96,562
8 Claims. (Cl. 20—23)

This invention relates to freight vehicle doors and more particularly to laterally movable doors of freight vehicles including the operating and locking mechanism for such doors.

In most cases, the laterally movable doors which are now in use have some type of operating mechanism for moving the doors laterally into and out of their door openings. Generally the actuation of these mechanisms requires several individual manual operations of various parts of the mechanisms for movement of the doors in each direction. The present invention simplifies the operation of the doors by providing mechanism wherein only a single manual operation is necessary to actuate the mechanism to move the doors laterally. In this single operation, the new mechanism also provides for automatically locking the doors in closed position after movement into the door openings and unlocking the doors before movement out of the door openings.

Accordingly, a principal object of the invention is to provide operating mechanism for a laterally movable door which when actuated by a single manual operation moves the door laterally into and out of its door opening.

An important object of the invention is the provision of operating and locking mechanism for a laterally movable door wherein a single manual operation actuates the mechanism for movement of the door into and out of the door opening and the door is respectively locked and unlocked in the door opening.

Another important object is to provide a laterally movable door having mechanism including an actuating handle rotatable in a plane parallel to the door wherein upon rotation of the handle in respectively opposite directions the mechanism moves the door laterally into and from the door opening and in such movements of the door one of its vertical edges is moved ahead of its other vertical edge.

A further object comprehends a laterally movable door having mechanism manually operable by means of a handle rotatable in a plane parallel to the door wherein upon rotation of the handle in respectively opposite directions the door moves laterally into and out of the door opening and in such movements of the door, its vertical trailing edge is moved into the door opening ahead of its vertical leading edge and its vertical leading edge is moved out of the door opening ahead of its vertical trailing edge.

A still further object contemplates a laterally movable door having mechanism which shall embody an operating cam member pivotally mounted on the door and having cam slots engaged by followers mounted at respective ends of oppositely extending operating rods guided for axial movement, wherein the contours of the cam slots effect the movements of the operating rods and are so shaped that one operating rod is moved ahead of the other when the cam plate is rotated, whereby one vertical edge of the door is caused to move laterally ahead of the respectively opposite vertical edge during movements of the door into and out of the door opening.

Still another object is to provide a laterally movable door for a freight vehicle having mechanism which shall include a pair of vertical shafts rotatably mounted on the door in spaced relationship and provided with crank arms at their upper and lower ends for lateral movement of the door into and out of the door opening and in such movements one shaft is rotated ahead of the other.

A further object is to provide a laterally movable door for a freight vehicle having mechanism including a locking arrangement wherein the vertical trailing edge of the door is locked and unlocked in the door opening sequentially with the actuation of the mechanism for respective movements of the door into and out of the door opening.

A further object is to provide a laterally movable door for a freight vehicle having roller-supporting means including a housing having a boss portion with a vertical threaded hole, an adjustable pivot pin having a threaded portion screwed into the threaded hole and non-metallic flexible inserts applied in holes inclined inwardly and upwardly in the boss portion of the housing whereby the inside ends of the inserts contact the threaded portion of the pivot pin to hold the pin in an adjusted height position.

The foregoing and other objects of the invention are attained by the mechanism and arrangement illustrated in the accompanying drawings wherein:

FIGS. 15, 16, 17, 18, 19, 20, 21 and 22 show the relative positions of the cam member, cam followers and actuating handle of the operating mechanism of this invention for various lateral positions of the laterally movable door, as indicated below:

This invention provides mechanism for a laterally movable door for freight vehicles. Actuation of the mechanism moves the door laterally into and out of a recessed door opening in the side wall of the vehicle. The mechanism is actuated by a single manual operation, and the door is locked and unlocked in the door opening sequentially with the actuation of the mechanism for respective movements of the door into and out of the door opening. In the lateral movements of the door, one of its vertical edges is moved ahead of its other vertical edge. A sealing arrangement, including a flexible sealing member secured to the door by means of a bendable retainer clip, acts to seal the door when in closed position within the door opening. The sealing member is so shaped and constructed as to have a high degree of spring back and substantially retard fatigue and deterioration of the material by repeated flexing.

In the drawings, 10 represents the side wall of a railway box car employing the usual construction including an angle section side sill 11, a channel section sub-side sill 12, a Z section side plate 13, outside sheathing 14 and inside lining 15. The side wall, as shown in FIGS. 1, 2, 3, 4A and 4B, is provided with a comparatively large-size door opening 16 and two doors, each of a different type, are used to cover the opening, with each door covering approximately one-half of the opening.

Figure 9:
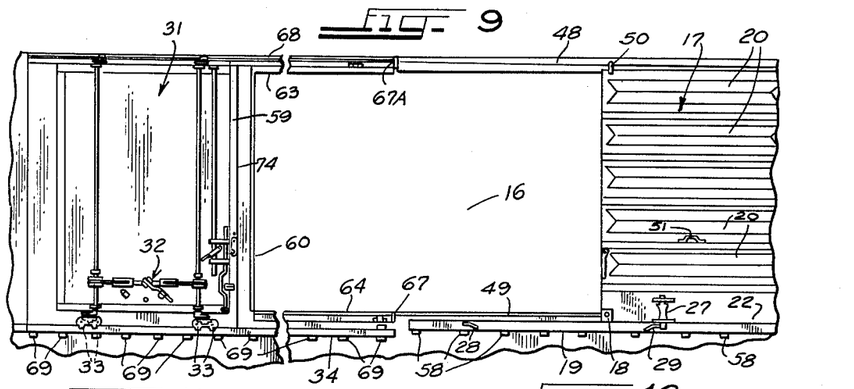
FIG. 9 shows the sliding and laterally movable side doors of FIG. 1 in full open position.

The door 17 covering the right-hand portion of opening 16 is of the sliding type usually provided on so-called standard railway box cars. The door is disposed outwardly from the opening and side wall of the car and is supported by rollers 18 which are movably mounted on the angle section track 19 extending in parallel relationship with the side wall so that the door can be moved longitudinally from its position covering the opening to a position beyond the opening to uncover the opening, as shown in FIG. 9. The construction of the door may be in various forms. The door shown is of welded construction and includes a plurality of horizontal juxtaposed members 20 and framing members generally Z shape in section extending along the top 21, bottom 22, vertical leading 23 and vertical trailing 24 edges of the door. The door is shown equipped with the usual parts necessary for the operation of the door including a locking device 25, a door opening and closing device 26, a safety latch 27, safety stops for door closed 28 and door open 29 positions, back stops 30 and an operating handle 51.

The door 31 covering the left-hand portion of opening 16 is of the laterally movable type which when in closed position is disposed within the side wall opening 16 so that the outside and inside surfaces of the door 31 are substantially flush with the respective outside and inside surfaces of the side wall 10. Operating mechanism designated generally by the numeral 32 is provided which, when actuated in one direction, moves the door laterally out of the door opening to a position outwardly of the opening and side wall and when actuated in the opposite direction, moves the door into the opening. By means of mechanism 32, as will later be described, the door 31 is supported by rollers 33, which are movably mounted on the bar section track 34 extending in parallel relationship with the side wall so that when the door is in the outward position it can be moved longitudinally to a position beyond the opening to uncover the opening as shown in FIG. 9.

The construction of door 31 in the form illustrated includes a built-up generally box section framing member extending along the top 35, bottom 36 and vertical trailing 37 edges of the door and a one-piece box section framing member 38 extending along the vertical leading edge. The vertical members 37 and 38 are welded at the upper and lower corners of the door to the top member 35 and the bottom member 36 respectively to provide a continuous outer frame for the door. Intermediate vertical 39 and horizontal 40 Z section stiffener members are provided which are fitted and welded at their ends to adjacent framing members. Outside sheathing 45 is secured to the framing members 35, 36, 37 and 38 and to the stiffener members 39 and 40 by welding. Wood furring members 41 are provided at and secured to the framing members 35, 36, 37 and 38 and to stiffener members 39 and 40 by bolts 42. Inside lining 43 is secured to the furring members 41 by nailing. A non-metallic flexible sealing member 44 extends along and is secured to the inside surfaces of the top, bottom and vertical trailing edge framing members 35, 36 and 37 which hereinafter will be more fully described.

The right-hand (sliding door 17) portion of door opening 16 is formed at the side by vertical box section post member 46 which extends between and is secured at its respective end portions to side sill 11 and side plate 13 by welding. Channel section header member 47 and angle section threshold member 49 form the top and bottom of the opening respectively. The header 47 and threshold 49 members are each welded at their outer ends to post 46 and extend inwardly from the post to approximately the center of the opening. The inner upstanding flange of header 47 is secured to the depending flange of side plate 13 and threshold 49 is welded to the cut-down upstanding flange of side sill 11. Generally Z shaped section door top retainer 48 is secured to side plate 13 and extends from approximately the center of opening 16 to post 46 and beyond for the full length of the movement of the door 17 as it travels to the full open position. Door guides 50 are welded to the door top framing member 21. Sliding door stop and sealing member 52 is secured to the front face of the vertical leading edge framing member 38 of the laterally movable door. Member 52 extends vertically substantially for the full height of the doors and is formed with a channel shaped groove 53 for engagement with the leading edge of door 17 when in closed position, thereby providing a weathertight and lightproof seal between the doors. Spark strip 54 and baffle plate 55 are secured to door post 46 and extend vertically substantially for the full height of the door. The hook portion 56 of the trailing edge of door 17 engages the formed groove of spark strip 54 and its edge surface 57 contacts the baffle plate 55 when the door is in closed position to provide a weathertight and lightproof seal at the trailing edge of the door.

The angle section door supporting track member 19 provided for door 17 is mounted on the side wall by means of brackets 58 secured to the sub-side sill 12 which space the track outwardly from and in parallel relationship with the side wall. The track 19 extends continuously from approximately the center of opening 16 to post 46 and beyond for the full length of the movement of the door as it travels to the full open position. As explained above, groove 53 of member 52 provides a front stop for door 17 which affords a limit to the maximum travel of the door to the closed position and stops 30 at the opposite end of the track and the top retainer act to limit the maximum travel of the door to the full open position.

Figures 10, 11, 12, 13, 14:
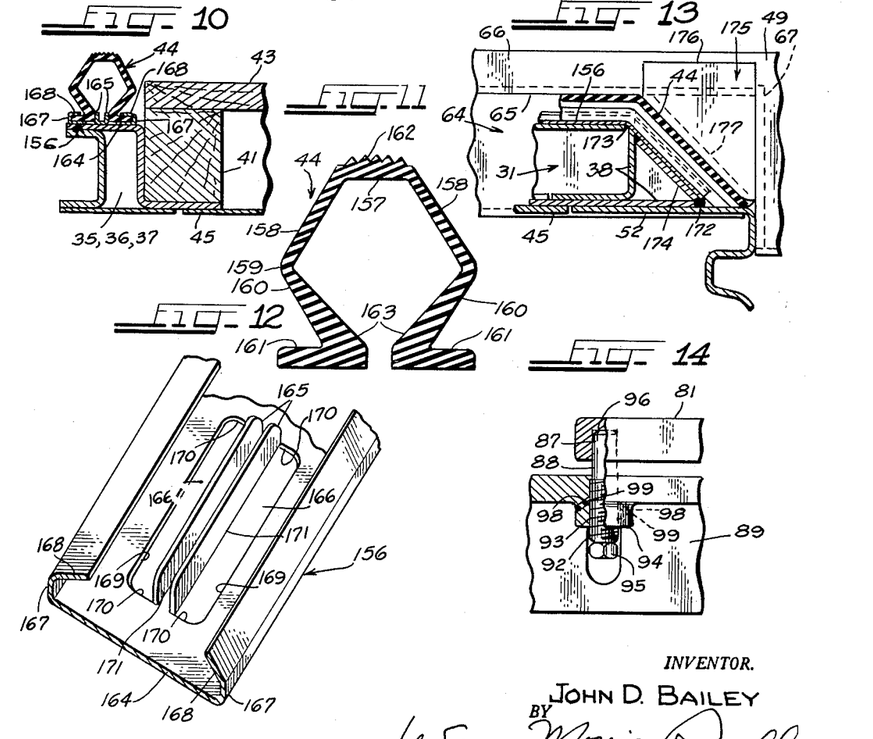
FIG. 10 is a sectional view of the edge portions of the laterally movable door of FIG. 1 showing the application of a non-metallic flexible sealing member.
FIG. 11 is a sectional view of the non-metallic flexible sealing member to a larger scale to more clearly show the shape and construction of the member.
FIG. 12 is an isometric view of the channel shape bendable retainer clip used for securing the sealing member to the laterally movable door.
FIG. 13 is a horizontal sectional view through the vertical leading edge portion of the laterally movable door of FIG. 1 at the lower corner portion thereof showing the application of the sealing member at this point.
FIG. 14 is an elevational view partly in section showing the locking arrangement for the adjustable pivot pin of the roller-supporting housing.

The left-hand (laterally movable door 31) portion of door opening 16 is formed at the side by vertical Z-shaped section post 59 which extends between and is secured at its respective end portions to side sill 11 and side plate 13 by welding. A similar Z section header member 61 is provided at the top of the opening extending from the door post 59 to approximately the center of the door opening. The header member has its outer upstanding flange 62 secured to the side plate 13 and its inner depending flange 63 is disposed flush with the inner flange 60 of door post 59. The header member is welded to the door post at the upper corner of the door opening to provide a continuous frame for the opening and the inner flanges 60 and 63 provide a continuous abutment at the top and side of the opening. At the bottom a member 64 extends continuously from the door post 59 to approximately the center of the opening 16. The member 64 is welded to the door post at the bottom corner of the door opening and longitudinally to the sub-side sill 12. The vertical upstanding portion 65 of member 64 is disposed flush with the inner flange 60 of door post 59 and is welded thereto. The inwardly directed flange 66 of member 64 overlies the floor of the car and affords a threshold at the opening. The abutment provided by flanges 60 and 63 of members 59 and 61 respectively and the vertical portion 65 of member 64 is disposed inwardly of the outside surface of the side wall thus to provide a recess for the reception of door 31 so that in its closed position the door may be disposed with its outside and inside surfaces substantially flush with the respective outside and inside surfaces of the side wall. At approximately the center of door opening 16 the respective inner ends of the door opening bottom members, 49 for door 17 and 64 for door 31, are welded to a connecting plate 67 transversely disposed between the ends of the members as shown in FIGURES 9 and 13 whereby a continuous bottom member is provided extending across the full width of the opening. A similar transversely disposed connecting plate 67A is provided at the top of the door opening in vertical alignment with plate 67. This plate joins the inner end of retainer member 48 with the inner end of retainer member 68. Retainer member 68 is secured to side plate 13 and extends longitudinally from plate 67A to post 59 and beyond for the full length of the movement of door 31 as it travels to the full open position.

The bar section door supporting track member 34 provided for door 31 is mounted on the side wall by means of brackets 69 secured to the sub-side sill 12 which space the track outwardly from and in parallel relationship with the side wall. The track 34 extends continuously from approximately the center of opening 16 to post 60 and beyond for the full length of the movement of the door as it travels to the full open position. Lugs 70 and 71 welded to the upwardly facing surface of track bar 34 and horizontal flange 72 of top retainer 68 respectively provide front stops for door 31 which limits the longitudinal travel of the door where movement is in the direction of the door opening. Door stops 73 are secured to the side wall and act to limit the maximum longitudinal travel of the door to the full open position. In the full open position of door 31, the vertical leading edge 74 of the door is located beyond the side of the door opening formed by post 59 so as to help protect the door and its operating mechanism from being damaged by trucks or lading during car loading and unloading operations.

Figure 1:
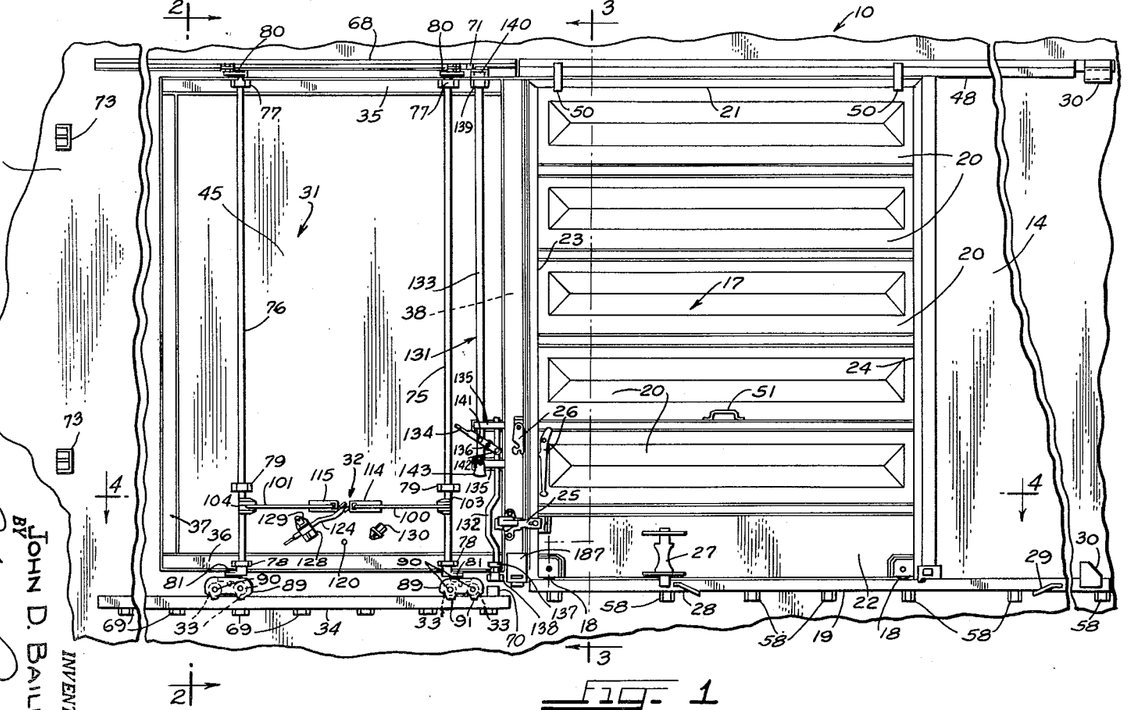
FIG. 1 is a fragmentary elevational view of the side wall of a freight vehicle showing a sliding side door in closed position covering approximately one-half of the side door opening of the vehicle adjacent to a laterally movable side door applied in and covering the remaining half of the door opening and incorporating the mechanism of this invention.

The operating mechanism 32 for the laterally movable door 31 includes a pair of vertical operating shafts 75 and 76 extending the full height of the door and disposed adjacent the vertical leading and trailing edges of the door respectively. The shafts are rotatably mounted adjacent the top and bottom of each shaft in guides 77 and 78 which are secured respectively to the top and bottom framing members 35 and 36 on the outside surfaces thereof. A third guide 79 is provided for each shaft located between guides 77 and 78 in the lower portions of the shafts as best shown in FIG. 1. At the top and bottom of each shaft is a horizontally disposed crank arm 80 and 81 respectively. The arms are each integrated with their respective shafts by welding and the top arms 80 are disposed above the top edge of the door and bottom arms 81 below the bottom edge which permits the door to pass between the arms during lateral movement into and out of the door opening. In the closed position of the door each pair of arms on each shaft is angularly directed toward the vertical center of the door forming equal acute angles with respect to the outer surface of the door. Adjacent the outer end of each top arm 80 is an upstanding pivot pin 82 fixedly secured to the arm and pivotally secured to a door guide shoe 83 which is slidably mounted in the retainer member 68. The guide shoe 83 has an outwardly facing surface 84 and a downwardly facing surface 85 which being in slidable contact with depending flange 86 and horizontal flange 72 of retainer 68 respectively guides the pivot pin 82 with respect to the side wall of the car and directs the top of the door during longitudinal movement. Adjacent the outer end of each bottom arm 81 is a recess 87 by which the arm is pivotally mounted on the pivot pin 88 of the roller-supporting housing 89.

Two vertically disposed rollers 33 are pivotally mounted in each housing 89 by means of pivot pins 90. The housing lugs 91 extending downwardly on each side of track bar 34 guide the rollers 33 and pivot pin 88 with respect to the track bar and side wall of the car and direct the bottom of the door during longitudinal movements. Each pivot pin 88 has a threaded lower portion 92 which screws into a vertical threaded hole 93 provided in the boss portion 94 of housing 89 as best shown in FIG. 14. A hexagon head 95 is provided at the lower end of pin 88 for turning the pin in hole 93 to adjust the height of the pin which, in turn, adjusts the height of the door through the lower arms 81 and shaft guides 78. The pins 88 support the arms 81 at their top ends 96 and the shoulder surfaces 97 provided at the tops of arms 81 support the lower shaft guides 78. A self-locking arrangement is provided for holding pivot pin 88 in an adjusted height position which, as illustrated in FIG. 14, comprises a series of inclined holes 98 extending inwardly and upwardly (approximately 45°) in the boss portion 94 of housing 89. Nonmetallic flexible inserts 99 are applied in the holes 98 with the inside ends of the inserts in contact with the threaded portion 92 of pin 88. The inserts being flexible form tight fitting threads around the pin and prevent it from turning without the use of external force as may be obtained by the use of a wrench applied to the head portion 95 of the pin. The angle at which the inserts are applied provides a support to resist back-out of the inserts from their holes, thereby providing a positive lock for the pivot pin.

The arms 80 and 81 are equal in length extending from the center point of shafts, 75 and 76, to the center point of each pivot pin, 82 and 88, so that each pair of pins (82 and 88) for each shaft is in vertical alignment with each other and provide hinging points for door 31 for movement into and out of the door opening 16.

The operating mechanism 32 further includes a pair of horizontal operating rods 100 and 101 extending in respectively opposite directions from an operating cam member 102, which is centrally located on door 31, to the shafts 75 and 76. Rods 100 and 101 are pivotally secured by means of vertical pin 105 adjacent their outer ends to connecting arms 103 and 104 respectively. Connecting arms 103 and 104 are each integrated with their respective operating shaft 75 and 76 by welding. The inner end portion of each operating rod is inwardly directed toward door 31 as at 106 for rod 100 and 107 for rod 101. The end portions 106 and 107 extend through their respective horizontal guide slots 108 and 109 provided in guide member 113 and have inwardly directed cam followers 110 and 111 mounted on their respective inner end surfaces. The cam followers engage cam slots provided in the operating cam member 102 which hereinafter will be more fully described.

Figure 5:
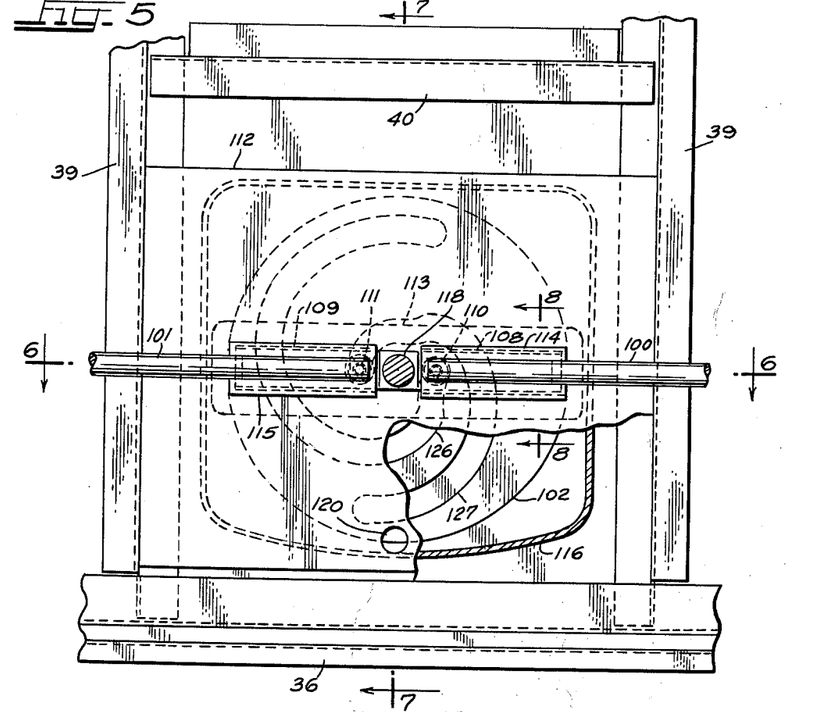
FIG. 5 is a fragmentary elevational view of the laterally movable door showing the operating mechanism of this invention applied to the door structure with the outside sheathing and the inside lining of the door removed to more clearly show the mechanism.
Figure 6:
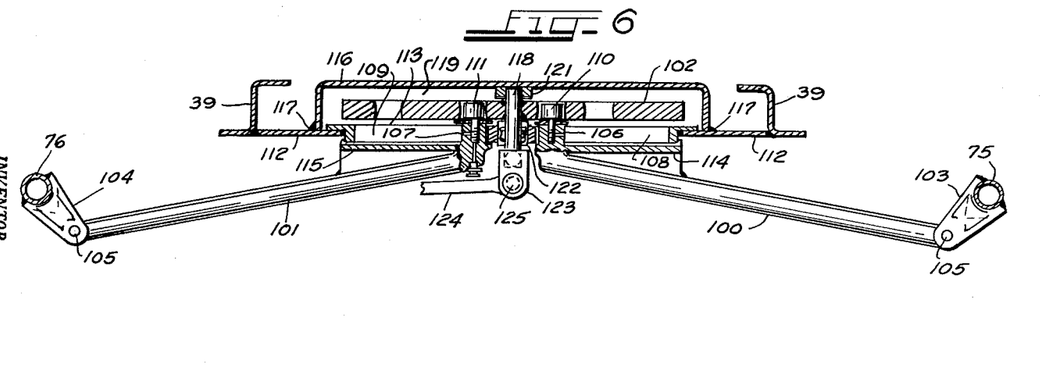
FIG. 6 is a horizontal sectional view taken on line 6—6 of FIG. 5.
Figure 7:
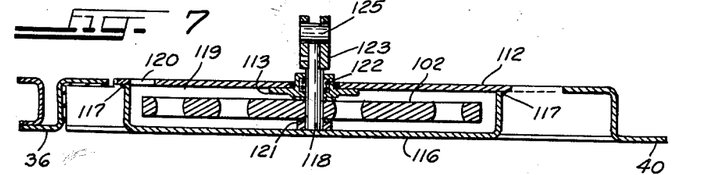
FIG. 7 is a vertical sectional view taken on line 7—7 of FIG. 5.
Figure 8:
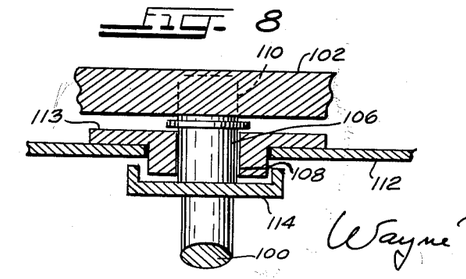
FIG. 8 is a vertical sectional view taken on line 8—8 of FIG. 5.

At the center of door 31 is an outer face plate 112 which, together with guide member 113, forms a base member for supporting the door operating mechanism. The plate extends between the vertical stiffeners 39 and is welded thereto as best shown in FIGURES 5, 6 and 7. The guide member 113, which provides the guide slots 108 and 109, is applied through matched openings in the face plate 112 and the outside sheathing 45 and is welded thereto as indicated. The end portions 106 and 107 of rods 100 and 101 are slidable in the respective slots 108 and 109, whereby the slots serve to guide and restrict the movement of the operating rods to axial or horizontal movement during lateral movements of door 31 into and out of door opening 16.

The operating cam member 102 is vertically disposed in the enclosure or cam pocket 119 which is formed by the outer face plate 112 and guide member 113 and the inner pan shaped housing member 116. The housing member 116 is welded to the face plate 112 along the edges of the flanges of the housing, as indicated at 117. At the inner end portion of each operating rod 100 and 101 is an integral flat vertical portion 114 and 115 adjacent slot openings 108 and 109 respectively which serve as covers for the slot openings when door 31 is in closed position to prevent snow, ice, dirt and other foreign matter from entering the cam pocket 119 through the slot openings, as best shown in FIGURE 6. Hole 120 at the center of door 31 adjacent the bottom of cam pocket 119 extends through the outside sheathing 45 and the face plate 112 and serves as a drainage hole for any moisture which may filter into the cam pocket. Cam member 102 is circular in shape and has a horizontal pivot pin 118 fixedly secured at its center. The pin 118 being substantially in normal alignment with the surfaces of the member extends through the member with its inner and outer end portions extending outwardly from the respective sides. The inner end portion of pin 118 is pivotally mounted in bearing 121 which is secured to the inside surface of the web portion of housing 116. The outer end portion of the pin is pivotally mounted and extends through bearing 122 which is provided in guide member 113. At the outer end of pin 118 is a yoke member 123 which is fixedly secured to the pin and is provided with a clevis at its outer end. The operating handle 124 of the mechanism is pivotally secured to the clevis by means of pivot pin 125 so that the operating handle can be swung 180° in an arc normal to the outside surface of the door with the operating handle in any of its several operating positions.

As shown in FIGURES 15, 17, 19 and 21, the operating cam member 102 is provided with two cam slots, 126 and 127, having contours shaped differently from each other. The cam slots are engaged by cam followers 110 and 111 as indicated. In the operation of the mechanism, cam member 102 is manually rotated by means of operating handle 124 through the center pivot pin 118 which is pivotally mounted in bearings 121 and 122 as described above. It is obvious that slots 126 and 127 also rotate with the rotation of the cam member so that the horizontal distances between the center of the pivot pin 118 and the centers of the cam slots on each side thereof are changed progressively during rotation. In this operation the cam followers are directed by the slots to move in respectively opposite directions and similarly the distances between the center of the pivot pin and the centers of the cam followers are changed progressively during rotation of the cam member with one cam follower moving ahead of the other due to the shape and arrangement of the slots.

Figures 15, 16, 17, 18:
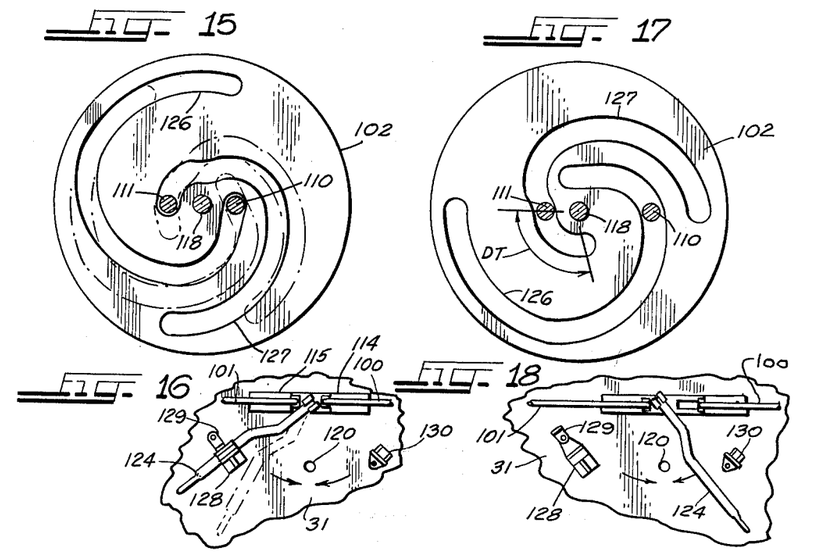
FIGS. 15 and 16—The door in closed and locked position within the recessed door opening.
FIGS. 17 and 18—The vertical trailing edge of the door remaining in the door opening and the vertical leading edge moved out approximately one-third of the full lateral movement of the door.
Figures 19, 20, 21, 22:
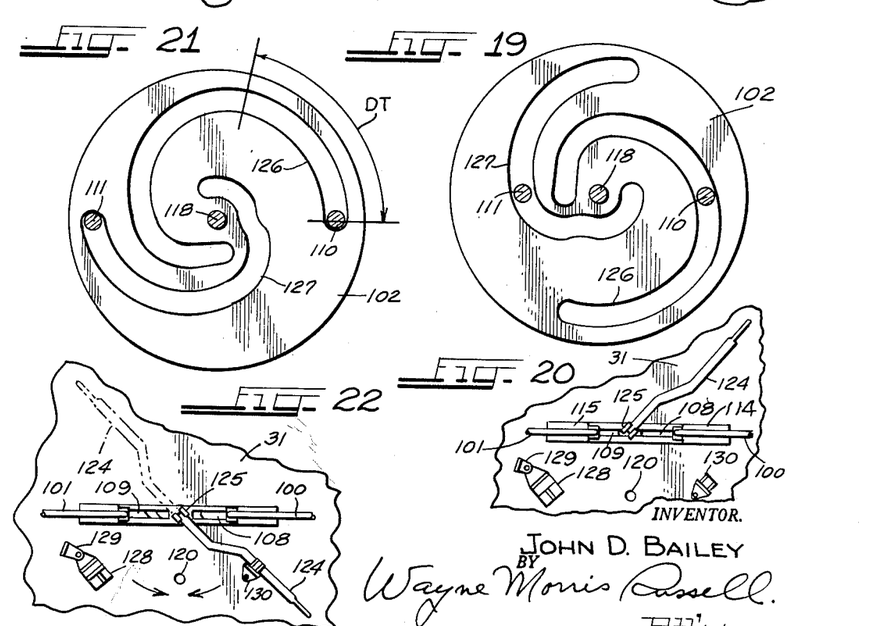
FIGS. 19 and 20—The vertical trailing and leading edges of the door each moved out of the door opening respectively approximately one-third and two-thirds of the full lateral movement of the door.
FIGS. 21 and 22—Both vertical edges of door moved out of door pocket the full lateral movement of the door.

Reference is now made to FIGURES 15 and 16 wherein certain parts of the mechanism are shown in their relative positions when door 31 is closed and locked within the recessed door opening 16. In this situation, the cam followers 110 and 111 are located at equal minimum distances from the pivot pin 118 on each side thereof and the inner ends of slots 126 and 127 are in contact with the followers. This locks the mechanism since there can be no horizontal movement of the followers without rotation of the cam member. In the closed position of the door, the operating handle 124 is put into a retainer member 128 which is secured to the outer face of the door and supports the handle as indicated in FIGURE 16. The retainer is channel shaped in section having generally upwardly extending flanges and a web portion supporting the handle. A sealing member 129 in the form of a pawl is provided at the top of the retainer which is pivoted at its top so that it may be swung counterclockwise to an upper position for removing the operating handle from the retainer and clockwise to a lower position when the handle is in the retainer. Stops are provided for holding the seal member in its upper and lower positions and an outwardly extending flange is provided on the seal member and on the retainer with a matching hole extending through the two flanges for the insertion of a seal. A similar retainer member 130, but without a sealing member, is provided oppositely to retainer 128 for holding the operating handle when the door is in the open position, as shown in FIGURE 22. It should be noted that the force or direction of movement of the handle in the retainers is downward in both cases, that is, in the actuation of the mechanism to open the door the operating handle is rotated counterclockwise and to close the door the handle is rotated clockwise. This arrangement helps to keep the operating handle in place in the retainers and when the door is in the closed position, it relieves pressure from the car seal so that it will not be sheared off.

Starting with the door in closed and locked position in the door opening, the mechanism is actuated for moving the door laterally out of the opening by first removing the operating handle 124 from the retainer 128 and then rotating the handle counterclockwise. Rotation of the operating handle rotates the cam member 102 and cam slots 126 and 127 in the same direction. At their inner ends both slots are circular shape about pin 118 to provide a small dead travel portion wherein there is no horizontal movement of the cam followers, as indicated by the dot and dash lines in FIGURES 15 and 16. Thus the door is locked in closed position and it cannot be moved outwardly until after the cam member has been rotated beyond the dead travel portion of slot 126 and the operating portion of the slot is engaged by follower 110. These dead travel portions of the cam slots prevent rotation of the cam member from any forces or loads that might be imposed upon the door from the sealing arrangement or lading until after the cam member has been actuated by the handle 124. The dead travel portion at the inner end of slot 127 is greater than that of slot 126 which will later be described. As the cam member and slots continue to rotate counterclockwise, the cam slots direct the cam followers moving them outwardly on each side from the pivot pin 118 and since the followers are mounted on the inner end portions of the operating rods 100 and 101, the rods are likewise moved accordingly. This movement of the operating rods causes swinging movement to the connecting arms 103 and 104 and rotation to the operating shafts 75 and 76 with respect to the door through their respective guides 77, 78 and 79. The rotation of the shafts causes the crank arms 80 and 81 to swing about the pivot pins 82 and 88 at the top and bottom of each shaft respectively which, in turn, moves the door laterally out of the door opening. The mechanism operates in the same manner except that the parts move in reverse direction when the door is moved laterally into the door opening in which case the operating handle 124 is first removed from the retainer 130, as shown in FIGURE 22, and then rotated clockwise.

One of the important features of the invention whereby one vertical edge of the door is moved ahead of the other vertical edge is best described by reference to FIGURES 15 to 22, which show the relative positions of the cam member 102, including the cam slots 126 and 127, the cam followers 110 and 111, and the operating handle 124 for various lateral positions of the door 31. As discussed above, FIGURES 15 and 16 show the parts of the mechanism in position when the door is closed and locked within the recessed door opening and in this situation, the cam followers 110 and 111 being aligned in horizontal plane with pivot pin 118 are at equal distances on each side of the pin. FIGURES 17 and 18 show the parts in position after handle 124 and cam member 102 have been rotated counterclockwise approximately 103° from their original positions in FIGURES 15 and 16. It can be seen that during this rotation cam slot 126 has directed follower 110 to a new position outwardly from its original position in FIGURE 15, while follower 111 has remained in the same position due to the dead travel portion DT provided at the inner end of cam slot 127, as indicated in FIGURE 17. Up to this point in the rotation, only the right-hand part of mechanism 32 has been actuated by the outward horizontal movement of follower 110. This partial operation of the mechanism has caused the leading edge 38 of door 31 to be moved laterally out of the door opening for a distance equal to approximately one-third of the full lateral movement of the door, but since there was no movement of follower 111 to actuate the left-hand part of the mechanism, the trailing edge 37 of the door remains in the door opening. In FIGURES 19 and 20, the operating handle and cam member have been rotated counterclockwise approximately 180°, and here it can be seen that follower 110 has been directed to a new position outward from its position in FIGURE 17 and follower 111 now being engaged with the operating portion of slot 127 has also been directed outwardly to a new position in the opposite direction. This outward movement of follower 111 has actuated the left-hand part of mechanism 32 which has caused the trailing edge 37 of the door to be moved laterally out of the door opening. At this point, the leading 38 and trailing 37 edges of the door have been moved out of the door opening to distances equal to approximately two-thirds and one-third of the full lateral movement of the door respectively. In FIGURES 21 and 22, the operating handle and cam member have been rotated counter-clockwise approximately 273°, which constitutes the full rotation necessary to direct the followers to their respective maximum outward positions on each side of pivot pin 118 as indicated. During this final stage of the operation, both the right-hand and left-hand parts of the mechanism continue to move the door outward until both door edges 38 and 37 have been moved to the full outward movement of the door whereby the door is then in position outside of and parallel to the side wall of the vehicle so that the door can be moved longitudinally to uncover the door opening. During the full rotation of the cam member to move the door outwardly, the dead travel portion DT provided at the outer end of cam slot 126, as indicated in FIGURE 21, allows the outward horizontal travel of follower 111 to catch up in distance to follower 110 and this, in turn, allows the door to straighten out so as to be in parallel relationship with the side wall of the vehicle.

Thus, from the foregoing, it can be seen that when the mechanism is actuated to move the door laterally out of the door opening by manual counterclockwise rotation of the operating handle 124, the leading edge 38 of the door moves ahead of the trailing edge 37. It is quite obvious then that when the mechanism is actuated to move the door laterally into the door opening by manual clockwise rotation of the operating handle, the mechanism operates in reverse so that the trailing edge 37 of the door moves ahead of the leading edge 38.

As explained above, the operating handle 124 is pivotally connected to pivot pin 118 by means of a clevis secured to the outer end of pin 118 and pin 125. The handle then can be swung 180° in an arc normal to the outside surface of door 31 as indicated in FIGURE 22 wherein the dot and dash lines indicate the position of the handle after it has been rotated counterclockwise 273° from its position where the door is in the door opening (FIGURE 16) to its position when door is out of the door opening (FIGURE 22). The full lines show the handle after it has been swung downward 180° and placed in the retainer member 130. The handle may be swung 180° to the opposite side of pivot pin 118 regardless of the angular position of the handle which provides a means whereby the full rotation of the handle can be made in either of the respective areas extending above or below the horizontal plane formed by the horizontal operating arms 100 and 101. An example of this operation is best described by referring to FIGURE 20 wherein the handle is shown extending in an upward direction to show the 180° counterclockwise rotation of the handle. The handle in this case could have been stopped in its rotating movement when it reached a horizontal position on the right side of pin 118 and then swung over to the left side of the pin to continue and complete its full counter-clockwise rotation below the horizontal plane. This is an important feature of the invention since it provides for easier operation of the door when the operator is standing on the ground level.

In the arrangement described above wherein the laterally movable door 31 is used in combination with the sliding door 17, the leading edge framing member 38 of door 31 serves as a door post for the leading edge 23 of door 17. The vertically disposed auxiliary locking bar device 131, shown in FIGURE 1, aids member 38 in this respect by securing it directly to the car structure at the top and bottom thereof. The locking device comprises a lower locking bar 132 which is slidably mounted in guides 135 and 137 secured to the outside surface of the door and an upper locking bar 133 which is also slidably mounted in guides 135 and in guide 139 which is likewise secured to the outside surface of the door. The operating handle 134 is pivotally secured to the door at 136 and to the locking bars 132 and 133 at 142 and 141 respectively so that when the handle is moved upward the lower bar 132 and the upper bar 133 are moved downwardly and upwardly respectively with their end portions being extended to engage keeper members 138 and 140 respectively. Keeper members 138 and 140 are secured to the car structure as shown in FIGURE 1. Thus the locking bars in their engagement with the keeper members provide an auxiliary lock for the door when in closed position, as well as a supporting means for door member 38 to resist any horizontal forces that might be applied against the member. When the handle is moved downwardly the movement of the locking bars is reversed and their end portions are retracted from the keeper members to unlock the door. A pivoted pawl-like gravity catch 143 is provided which, having an inwardly directed flange, supports the lower end of the upper bar 133 in its locked position and thereby prevents both bars 132 and 133 from disengagement with the keeper members 138 and 140. The catch 143 may be swung out of the way when the handle is to be operated to disengage the locking bars.

Figures 25, 26:
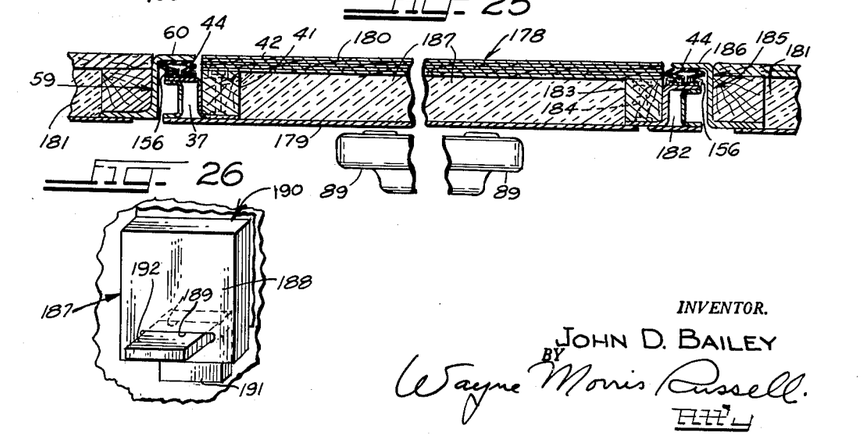
FIG. 25 is a horizontal sectional view through a laterally movable door and a recessed door opening in the wall of a refrigerator freight vehicle showing the door in closed position within the door opening.
FIG. 26 is a perspective view of an interengaging device for the laterally movable door of FIG. 1 showing the device in engaged position.

The leading edge framing member 38 of the door 31 is further secured to the car structure by the inter-engaging device 187 located at the lower leading edge corner of the door. The device, as best shown in FIGURE 26, comprises a plate member 188, the top portion of which is disposed against and secured to the outside surface of the door. The lower portion of the member projects below the bottom edge of the door and a horizontal slot 189 is provided in the member adjacent the lower edge thereof. The downwardly directed vertical flange 191 of angle member 190 is disposed against and secured to the outside surface of the sub-side sill channel 12, thereby securing the angle member to the car structure. The angle member is disposed on the side sill member in vertical and horizontal alignment with slot 189 of member 188 so that when the door is in closed position the outwardly directed horizontal flange 192 of angle member 190 engages the slot thereby preventing relative vertical movement of the door within the door opening at the leading edge thereof. At the top, bottom and opposite trailing edges, the door is prevented from such vertical movement by the sealing contacts made between the sealing members 44 and the abutment surfaces 63, 65 and 60 of the door opening framing members as will be hereinafter more fully described. Engagement and disengagement of flange 192 with slot 189 is made automatically during the respective movement of the door into and out of the door opening.

Railway box cars are used to some extent for hauling grain and other types of bulk commodities. This includes the use of box cars having the two-door combination of a laterally movable side door and a sliding side door as described herein in which case only the sliding door is used in the car loading and unloading operations. The laterally movable door remains in its closed position within the door opening and serves as additional side wall area to support the lading. Due to compactness, such types of lading produce substantial horizontal loads which are imposed upon the door especially in the lower portion of the door. To help resist such loads and prevent outward bulging of the door, an auxiliary lock and supporting device is provided, as shown in FIGURES 23 and 24.

Figure 23:
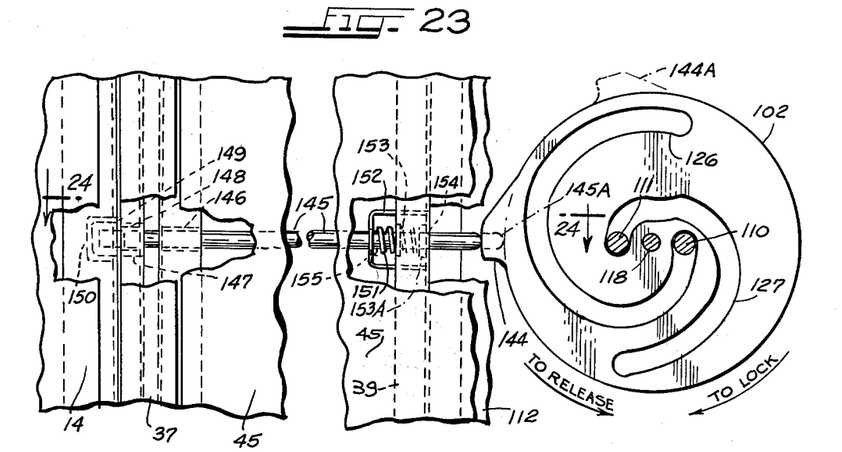
FIG. 23 is a fragmentary elevational view of the laterally movable door of FIG. 1 with portions of the outside sheathing broken away to show an auxiliary locking and supporting arrangement for the vertical trailing edge of the door.
Figure 24:
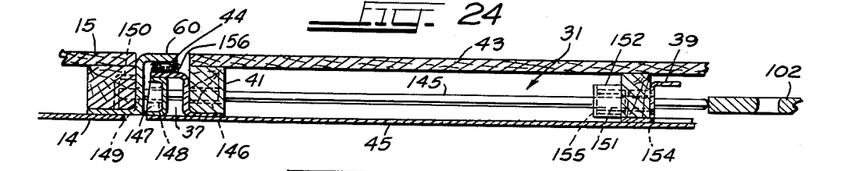
FIG. 24 is a horizontal sectional view taken on line 24—24 of FIG. 23.

This device operates in conjunction with the door operating mechanism 32 and requires only a slight modification to the cam member 102 comprising the addition of lug 144 to its outer edge as shown in FIGURE 23. The device consists of the operating bar 145 which is located within the door in the space between the outside sheathing 45 and the inside lining 43. The bar is disposed in horizontal alignment with the center pivot pin 118 of cam member 102 and extends to the left of the cam member as indicated. Starting at its right end and extending to the left, the bar 145 first passes through hole 154 provided in the web of the vertical door stiffener 39 and then through hole 155 provided in the vertical web portion of the channel-shaped member 152. The ends of the horizontal flanges of member 152 are welded to stiffener 39 and they, together with the web portions of member 152 and stiffener 39, form a housing enclosing the compression coil spring 151 which is applied over bar 145. Spring 151 is held in place between the web portion of member 152 and a washer type stop 153 which is welded to the bar 145. Continuing to the left, the bar 145 passes through hole 146 provided in furring strip 41 and in the first adjacent web portion of the door trailing edge framing member 37 and then through hole 148 provided in the second web portion of framing member 37 and in the bar bearing member 147 which extends between and is welded to the outwardly directed flanges of framing member 37 and to their connecting web. FIGURES 23 and 24 show the device in locked position which occurs when the door is in closed position within the door opening. In this position, bar 145 extends through and projects beyond hole 149 provided in the web portion of car door post 59 which acts as a keeper for bar 145 when in locked position. The cap type member 150 is welded to the web and outer flange of post 59 to form a pocket to receive the left end portion of bar 145. As noted above, the locking and supporting device is shown in locked position in FIGURE 23 in which case the door 31 is in closed position as indicated by the position of cam member 102. The right end surface of bar 145 is in contact with the outer edge surface of lug 144 and the left end portion of bar 145 extends through the keeper hole 149. Contact between bar 145 and cam member 102 is maintained by compression spring 151 which in the locked position is deflected under load, as indicated by the position of washer support 153. When the cam member is rotated counterclockwise to open the door, the lug 144 is moved out of horizontal alignment with bar 145 and the bar is moved to the right due to the load on spring 151 and the washer stop 153 is moved to the right, as shown in dot and dash lines at 153A. The rod is moved with its right end surface in contact with the curved edge surface of the cam member, as shown in dot and dash lines at 145A. The dot and dash lines at 144A indicate the position of lug 144 when the door is in full lateral open position; the cam member having been rotated 273° as hereinbefore described. The left end portion of bar 145 is, of course, retracted from keeper hole 149 with the rightward movement of the bar and the device is then in the unlocked position. It is easily perceived that the device operates in reverse to return to its locked and supporting position, as shown in FIGURES 23 and 24, when the cam member is reversely rotated clockwise to close door. As hereinbefore described, the locking bar arrangement 131 provides additional supporting means to resist horizontal loads at the leading edge of the door.

Figure 2:
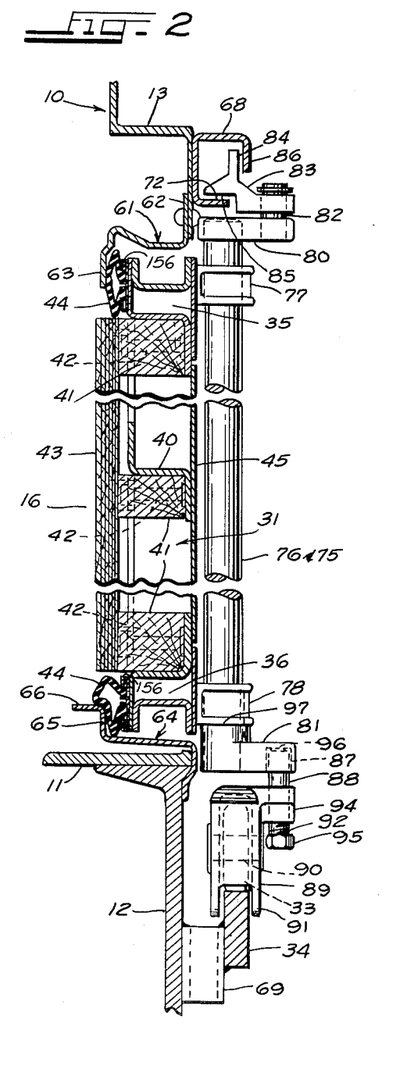
FIG. 2 is a vertical sectional view taken on line 2—2 of FIG. 1 showing the laterally movable door in closed position within the recessed portion of the side door opening.
Figure 3:
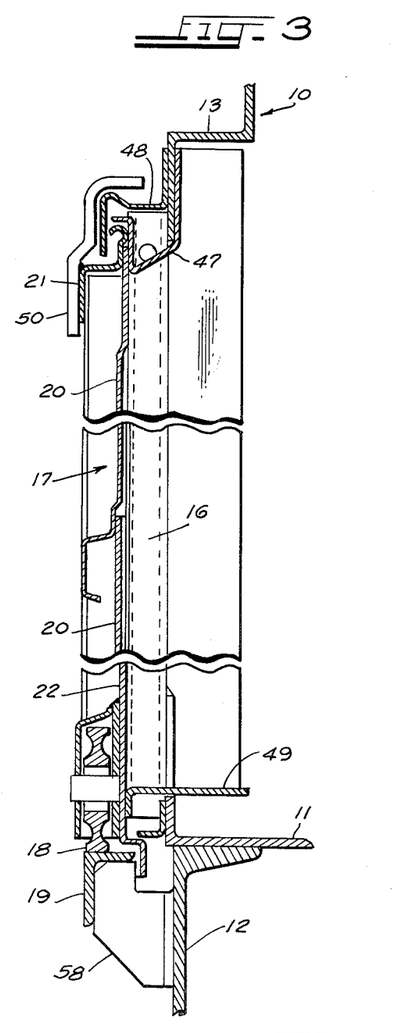
FIG. 3 is a vertical sectional view taken on line 3—3 of FIG. 1, showing the sliding door in closed position.
Figure 4A:
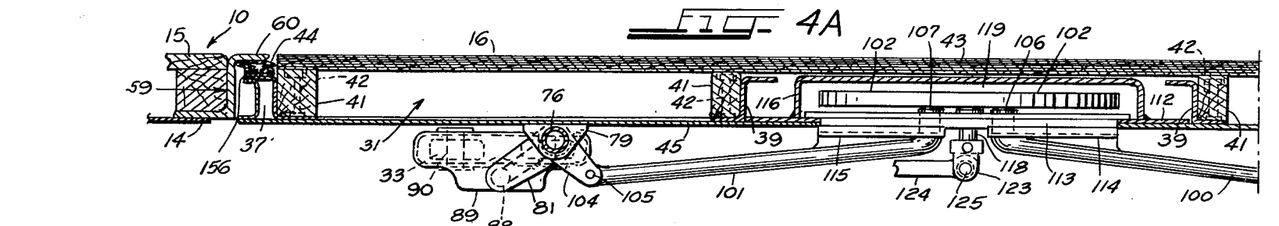
FIGS. 4A and 4B are complemental horizontal sectional views taken on line 4—4 of FIG. 1, showing the sliding side door and the laterally movable side door in closed position.
Figure 4B:
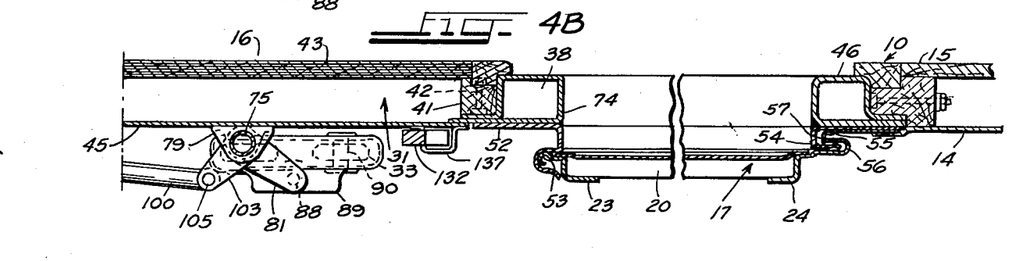

The sealing arrangement for the laterally movable door 31 functions in conjunction with the operating mechanism 32 and being compressible, it seals the door when the door is in closed position within the door opening. The arrangement comprises a non-metallic flexible sealing member 44 which, as shown in FIGURES 2 and 4A, extends along the top, bottom and trailing edges of the door. As best shown in FIGURE 10, sealing member 44 is secured to the inside surfaces of the door framing members 35, 36 and 37 by means of retainer clip 156. As viewed in FIGURE 11, the sealing member 44 comprises a flat top sealing portion 157 which is connected at each end to respectively opposite upper side portions 158. The upper side portions 158 each extend outwardly and downwardly from the top sealing portion to juncture points 159 located midway between the top and bottom surfaces of the member. The lower ends of each upper side portion 158 are connected to lower side portions 160, each of which extend inwardly and downwardly therefrom and are connected at their respective lower ends to the outwardly directed base flanges 161. Thus the upper 158 and lower 160 side portions form oppositely outwardly directed obtuse angles with each other at the juncture points 159. The top portion 157 is preferably formed with a serrated top surface 162 to provide a weathertight and lightproof seal when in contact with the door opening framing members. As clearly illustrated in FIGURE 11, the lower side portions 160 are each formed with a thickness varying in size from minimum at juncture point 159 to maximum at lower juncture point 163 to flange 161, thereby providing enlarged heels at the feet or base of the section.

The retainer clip 156 which is used to secure sealing member 44 to the door is illustrated in FIGURE 12. The clip is generally channel shape in section, with the web portion 164 serving as the base. A plurality of inner spacer flanges 165 are provided at longitudinally spaced intervals in the web portion 164. The flanges 165 are formed from material obtained by cutting slots 166 in web 164. The slots are formed by first cutting the web material at side 169 and ends 170 and then bending the material upward at 171 to form flange 165. The upper portions 168 of the outer upwardly directed flanges 167 are bent inwardly forming sloping, bendable portions as indicated.

The retainer clip 156 is first applied to the door edge framing members 35, 36 and 37 in the form as shown in FIGURE 12 extending substantially for the full length of the members and is secured thereto by welding. The sealing member 44 is then inserted into the retainer clip 156 with flanges 161 fitted in place on respectively opposite sides thereof between the inner flanges 165 and outer flanges 167. The upper sloping portions 168 of flanges 167 are then bent down over the outer portions of flanges 161 to securely hold the sealing member in place, as shown in FIGURE 10. This method of securing the sealing member to the door is more feasible and economical than other methods sometimes employed wherein holes are required in the framing members of the door for application of fasteners or wooden strips are provided in the door framing for nailing the sealing members.

From the foregoing, it can be seen that the sealing member 44 is pantograph shape in section and is applied to the door with the top surface projecting beyond the inside surface of the door so that the member is subjected to considerable deflection when the door is in closed position as clearly shown in FIGURES 2 and 4A. The flat serrated top surface of the members provides a good sealing surface for contact with the metal abutment formed in the framing of the door opening, so that a weathertight and lightproof seal is provided between the door and door opening framework when the door is in closed position. The outside obtuse angles of the sealing members provided at 159 locate the position of the creasing points of the members during deflection, which may be noted in FIGURES 2 and 4A. This feature helps retard fatigue and deterioration of the material by repeated flexing. The enlarged heels at the feet or base of the member provide for a high degree of spring back to return the member substantially to its original shape when the door is in the open position out of the door opening which helps to minimize permanent set of the member.

As described above, the sealing member 44 is provided along the top, bottom and trailing edges of the door. The trailing ends of the top and bottom members are joined to the respective top and bottom ends of the trailing edge member to form one continuous sealing member extending around the three edges of the door. The top and bottom members terminate at the leading edge of the door as illustrated in FIGURE 13. While FIGURE 13 is actually a horizontal sectional view through the lower corner portion of door 31 and shows the arrangement of the door and the bottom members 49 and 64 of the door opening at this point, the drawing also applies to the respectively opposite upper corner portion of the door and the header members of the door opening which are similarly arranged so that the end portions of the top and bottom sealing members are applied in the same manner. As indicated, the lower outer portion of the leading edge framing member 38 is coped out horizontally from the vertical leading surface 74 to points 172 and 173 of the outer and inner portions of the member respectively and vertically from the bottom edge of the member to a point above to provide sufficient space for the application of the sealing member 44 and retainer 156. A plate 174 extending between the vertical cutoff points 172 and 173 and the bottom edge of the member to the horizontal cutoff point above is welded in place as indicated. Retainer 156 and sealing member 44 extend around the supporting surface formed by plate 174 with the retainer secured thereto and terminating against the inside surface of the sliding door stop and sealing member 52. A filler member 175 is welded in place in the corner pocket formed by the connecting plate 67 and the vertical portion 65 and lower horizontal portion of the bottom door opening member 64. Filler member 175 is angular in form, having a top horizontal flange 176 and downwardly extending vertical flange 177. Horizontal flange 176 is fitted into a coped-out portion of flange 66 of door opening member 64, so as to be flush with the top surfaces of flanges 66 and 49. The flange 177 is disposed in spaced parallel relationship with plate 174 and being the same height as the vertical portion 65 of the door opening framing member 64 provides a continuing contacting surface for the sealing surface 162 of sealing member 44 when the door is in closed position. Thus a weathertight and lightproof seal is provided at the top and bottom edges of the door at the leading edge thereof.

Laterally movable doors are used to a great extent on railway refrigerator cars, but in this service, only one door is used for each door opening and the doors must effectively seal the complete opening when they are in closed position to prevent loss of refrigeration through leaks around the edges of the doors. These doors are insulated like the car bodies and because of their lateral movement in to the door openings to closed position, they are sometimes referred to as "plug doors." Such a door is illustrated in FIGURE 25, which is a fragmentary horizontal sectional view through the door opening of a railway refrigerator car and shows a door 178 in closed position within the recessed opening so that the inside and outside surfaces of the door are substantially flush with the respective inside and outside surfaces of the wall of the car. The construction of door 178 is like that of door 31 as shown in FIGURES 1, 2, 4A and 4B except that the framing member 182, wood furring strip 183 and fasteners 184 at the leading edge of the door are like the framing member 37, wood furring strip 41 and fasteners 42 at the trailing edge. The outside sheathing 179 and inside lining 180 is like the outside sheathing 45 and the inside lining 43 of door 31. The intermediate stiffeners and supporting members shown in FIGURES 4A, 5, 6 and 7 are provided in door 178 and the operating mechanism provided is like that of door 31, as shown in FIGURES 1, 2, 4A, 4B, 5, 6, 7 and 15 to 22 inclusive, including the longitudinally disposed upper door guideway and retainer and the lower door track bar each of which is secured to the outside surface of the wall of the car. Insulation 187, which is like insulation 181 in the body of the car, is provided in the space between the outside sheathing 179 and inside lining 180 of the door.

The door opening framing for door 178 is like the door opening framing for door 31 except that Z section door post 185 is provided at the leading edge of the door which is like door post 59 provided at the trailing edge. The top 61 and bottom 64 framing members of the door opening extend between and are secured at their respective ends to posts 59 and 185 to form a continuous frame around the door opening. The flange 63 of top member 61 and vertical portion 65 of bottom member 64 are disposed flush with the inner flanges 60 and 186 of door posts 59 and 185 respectively to provide a continuous abutment for the door and are disposed inwardly of the outside surface of the wall of the car, thereby providing a recess for the reception of the door. Sealing member 44 is applied to the leading edge member 182 of door 178 by means of retainer 156 in the same manner as at the top, bottom and trailing edges and the top and bottom ends of the sealing member are joined to the respectively leading ends of the top and bottom sealing members to form one continuous sealing unit extending along the four edges of the door.

The operation of door 31 to close and lock the door and to unlock and open the door, as hereinbefore described also applies to door 178 since the operating mechanism of door 178 is like the operating mechanism of door 31. It should be pointed out that plug door 178 can be made to move laterally and longitudinally in a reverse manner from door 31 by the simple expedient of applying the cam member 102 in turn-around position. This reverses the arrangement of the cam slots 126 and 127 so that clockwise rotation of the cam member moves the door out of the door opening with the vertical edge 37 moving ahead of vertical edge 182 and the vertical edge 37 then becomes the leading edge of the door. Counterclockwise rotation of the cam member moves the door into the door opening with the trailing edge 182 moving ahead of the leading edge 37. In this situation the retainer members 128 and 130 for holding the operating handle 124 in position are reversed with respect to their location on the door and the bar section track member 34 extends to the right of the door opening so that when the door is in the outward position it can be moved longitudinally to the right of the door opening to uncover the opening which is the usual practice for single sliding doors on freight vehicles.

Figure 27:
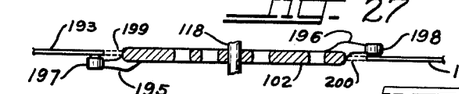
FIG. 27 is a fragmentary horizontal sectional view similar to FIG. 24.

An auxiliary locking and supporting device is provided for door 178 which is similar to the device provided for door 31 except that it includes double horizontal locking bars 193 and 194 as shown in FIG. 27. Like the device of door 31, this device operates in conjunction with the door operating mechanism 32. The bars 193 and 194 are disposed in horizontal alignment with the center pivot pin 118 of cam member 102 and extend in respectively opposite directions on each side of the cam member. Bar 193 in its extended or locked position engages a keeper hole provided in post member 59 and bar 194 a keeper hole in post member 185. Like bar 145, each bar 193 and 194 is provided with a spring device for retracting the bars during rotation of the cam member to move the door out of the door opening. Lugs 195 and 196 are provided on the cam member in respectively opposite offset positions as indicated to clear the opposite locking bar during rotation of the cam member. Followers 197 and 198 are pivotally mounted on the respective inner end portions of the rods 193 and 194. These followers contact their respective lugs 195 and 196, which are the same shape as lug 144, during rotation of the cam member to move the door into the door opening and thereby the bars are moved to their respective extended positions engaging the keeper holes in the respective post members. In their retracted positions the inner ends of the bars contact the outer edge of the cam member as indicated in dot and dash lines at 199 and 200.

From the foregoing than it can be seen that this invention provides an operating and locking mechanism for a laterally movable door which when actuated by a single manual operation moves the door laterally into and out of the door opening and the door is respectively locked and unlocked in the opening and, further, during such lateral movements of the door, one of its vertical edges is moved ahead of its other vertical edge. The invention also provides a sealing arrangement comprising a nonmetallic sealing member which is compressible when acting to seal the door in closed position and is of such shape and construction as to provide a high degree of spring back to its original shape when not compressed and substantially retard fatigue and deterioration of the material by repeated flexing. The lateral movement of the door of this invention provides certain advantages with respect to the compression of the sealing members. Since one vertical edge of the door is moved ahead of the other vertical edge when the door is being moved into the door opening, the vertical portions of the sealing arrangement are compressed one at a time which requires considerably less force than is required to compress all edges at the same time. When the door has been sealed for a period of time, the sealing members may become frozen or stuck to the abutment surfaces of the door opening framework and considerable force would be required to break the sealing contact of all the sealing members at the same time. Here again, by the movement of the door out of the door opening, one vertical sealing member is released ahead of the other so that comparatively less force is required to break the sealing contact of the sealing members and the possibility of damaging the members is greatly reduced.

What is claimed is:

1. The combination with a vehicle side door opening and a laterally movable door therefor including a pair of vertical shafts rotatably mounted on the door adjacent the respectively opposite vertical edges thereof for mounting said door upon the side of the vehicle for lateral movement and rod connecting arms secured to said shafts, an actuating mechanism for rotating said shafts comprising a cam member having a pivot pin rotatably mounted on said door intermediate said shafts, and a plurality of generally spiral form cam surfaces, said surfaces having unlike contours each including a circular dead travel portion and a cam operating portion and being disposed outwardly around said pivot pin in substantially overlapping relation with each other, a handle secured to said pivot pin of said cam member for imparting rotation thereto, a pair of oppositely extending rods having means at their respective inner ends engaging said cam surfaces and pivotally secured at their respective outer ends to said arms, said cam surfaces effecting alternate axial movement of said rods during rotation of said cam member to impart swinging movement to said arms and thereby rotate said shafts alternately to move the door into and out of said door opening.

2. The combination claimed in claim 1 in which a vertical base member is provided substantially in flush alignment with the outer face of said door, said base member having a horizontal pivot bearing intermediate said shafts and a pair of oppositely extending guide slots in horizontal alignment on each side of said bearing, said pivot pin of said cam member being mounted in said bearing, said rods having integral flat veritcal portions adjacent their respective inner ends in proximate parallel relationship with the outer face of said base member to serve as covers for said guide slots, and said means of said rods extending through said guide slots and being slidable therein thereby guiding said rods for movement in a horizontal plane during rotation of said cam member.

3. The combination claimed in claim 1 in which a pivotal connection is provided between the inner end portion of said cam handle and the outer end portion of said cam pivot pin, said connection having a pivot axially disposed in a plane parallel to the outer face of said door.

4. In an actuating mechanism for a laterally movable door of a vehicle door opening said mechanism including a pair of vertical shafts rotatably mounted on the door adjacent the respectively opposite vertical edges thereof for mounting said door upon the side of the vehicle for lateral movement and rod connecting arms secured to said shafts, a cam member disposed within said door having a pivot pin rotatably mounted transversely on said door intermediate said shafts and a plurality of generally spiral form cam slots, said slots having unlike contours each including a circular dead travel portion and a cam operating portion and being disposed outwardly around said pivot pin in substantially over-lapping relation with each other, a handle secured to said pivot pin for imparting rotation thereto, a pair of oppositely extending rods having means at their respective inner ends engaging said cam slots and pivotally secured at their respective outer ends to said arms, said cam slots effecting alternate axial movement of said rods during rotation of said cam member to impart swinging movement to said arms and thereby rotate said shafts alternately to move the door into and out of said door opening.

5. In a laterally movable door of a vehicle door opening having an actuating mechanism for moving said door into and out of said door opening including a cam member vertically disposed within said door, said cam member having a horizontal pivot pin rotatably mounted on said door, a keeper hole in the frame-work on each side of said door opening, a locking and supporting device disposed within said door having double slidable locking bars in horizontal alignment with said pivot pin of said cam member and extending in respectively opposite directions on each side thereof, a pair of oppositely outwardly extending lug portions on said cam member contacting and moving said locking bars to extended position to engage said keeper holes in the respective side framework of said door opening during rotation of said cam member to move said door into said door opening, and each said locking bar having a spring arrangement retracting said bars during rotation of said cam member to move said door out of said door opening.

6. The combination claimed in claim 4 in which the circular dead travel portion and the cam operating portion of said contours are disposed respectively at the inner and outer ends of one said contour and at the outer and inner ends of another said contour.

7. In a laterally movable door of a vehicle door opening having an actuating mechanism for moving said door into and out of said door opening including a cam member vertically disposed within said door, said cam member having a horizontal pivot pin rotatably mounted on said door, a manually operated device mounted on the outside face of said door adjacent one edge thereof, said device having oppositely extending vertical locking bars engaging keeper members secured to the side of the vehicle adjacent the top and bottom of said door opening, an automatically operated device mounted within said door having a slidable locking bar actuated by said cam member to engage a keeper hole in the door opening framework at the edge of said door opposite said first mentioned edge, said automatically operated device being in alignment with said cam member and said cam member having a lug portion extending outwardly from its outer edge, said lug portion contacting and moving said locking bar to extended position during rotation of said cam member to move said door into said door opening, and a spring arrangement in said device retracting said locking bar during rotation of said cam member to move said door out of said door opening.

8. The combination claimed in claim 7 in which the locking bar of said automatically operated device is in horizontal alignment with the pivot pin of said cam member and engages a keeper hole in a verticle door post of the vehicle.

References Cited by the Examiner
UNITED STATES PATENTS

| | | | |
|---|---|---|---|
| 822,562 | 6/06 | Tucker | 292—37 |
| 2,140,570 | 12/38 | Young | 292—48 X |
| 2,473,065 | 6/49 | Miller | 292—37 |
| 2,747,239 | 5/56 | Soddy | 20—23 |
| 2,975,490 | 3/61 | Beauchamp | 20—23 |
| 2,988,788 | 6/61 | Saponara | 20—69 |
| 2,993,243 | 7/61 | Beauchamp | 20—69 |
| 2,997,752 | 8/61 | Hindrikson et al. | 20—23 |
| 3,045,295 | 7/62 | Beauchamp | 20—23 |

HARRISON R. MOSELEY, *Primary Examiner.*

GEORGE NINAS, Jr., CHARLES O'CONNELL,
*Examiners.*